US008886179B2

(12) United States Patent
Pathuri et al.

(10) Patent No.: US 8,886,179 B2
(45) Date of Patent: Nov. 11, 2014

(54) FIELDED DEVICE FAILURE TRACKING AND RESPONSE

(75) Inventors: Hanumantha R. Pathuri, San Diego, CA (US); Ramesh Sathyanarayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1083 days.

(21) Appl. No.: 12/679,454

(22) PCT Filed: Oct. 23, 2007

(86) PCT No.: PCT/US2007/082235
§ 371 (c)(1),
(2), (4) Date: Mar. 22, 2010

(87) PCT Pub. No.: WO2009/054847
PCT Pub. Date: Apr. 30, 2009

(65) Prior Publication Data
US 2010/0197238 A1     Aug. 5, 2010

(51) Int. Cl.
*H04W 24/00* (2009.01)
*H04L 12/24* (2006.01)
*H04L 12/26* (2006.01)

(52) U.S. Cl.
CPC ............ *H04L 41/12* (2013.01); *H04L 43/0817* (2013.01); *H04L 41/0681* (2013.01); *H04L 43/16* (2013.01); *H04L 41/0609* (2013.01)
USPC ..... 455/425; 455/423; 455/456.1; 455/456.6; 455/67.11; 455/67.15; 455/68; 455/69

(58) Field of Classification Search
USPC .................. 455/423–425, 67.11–67.16, 67.7, 455/418–420, 414.1–414.2, 404.2, 455/456.1–456.3, 68–69, 561
See application file for complete search history.

(56) References Cited

U.S. PATENT DOCUMENTS

| 5,805,666 A * | 9/1998 | Ishizuka et al. ............... 379/1.01 |
| 6,088,588 A * | 7/2000 | Osborne ....................... 455/425 |

(Continued)

FOREIGN PATENT DOCUMENTS

| CN | 1611088 A | 4/2005 |
| CN | 1902970 A | 1/2007 |

(Continued)

OTHER PUBLICATIONS

International Search Report and Written Opinion—PCT/US2007/082235—ISA/EPO—Oct. 1, 2008.

(Continued)

*Primary Examiner* — Tuan A Tran

(57) ABSTRACT

A fault remediation system for fielded wireless mobile devices addresses field failure data collection, consolidation of field failure data, and an information services platform so that the players in a wireless/mobile broadcast/broadband application/service value chain to respond to field failure problems in a consistent and automated manner from wireless/mobile devices over wireless multicast and or wireless broadband networks. An elegant and extremely flexible mechanism enables the failure data collection from a targeted set of wireless/mobile devices. In addition, sophisticated mechanisms identify targeted set of devices that should participate in field failure data collection based on user specified operational requirements (e.g., selected OEM, device configuration type, subscribers to a specific wireless broadband serve, failure occurrence certain time limits, etc.). The fault data logging on the mobile device is vertically integrated to allow diagnosis and assignment to a responsible party for fixing, testing, and release with subsequent certification and deployment.

25 Claims, 7 Drawing Sheets

(56) References Cited

U.S. PATENT DOCUMENTS

| | | | |
|---|---|---|---|
| 6,112,236 A * | 8/2000 | Dollin et al. | 709/224 |
| 6,308,071 B1 * | 10/2001 | Kalev | 455/446 |
| 6,434,364 B1 * | 8/2002 | O'Riordain | 455/67.11 |
| 7,043,237 B2 * | 5/2006 | Snyder et al. | 455/425 |
| 7,596,373 B2 * | 9/2009 | McGregor et al. | 455/425 |
| 2001/0049263 A1 * | 12/2001 | Zhang | 455/67.1 |
| 2003/0134631 A1 * | 7/2003 | Snyder et al. | 455/423 |
| 2004/0166846 A1 | 8/2004 | Backes et al. | |
| 2005/0113029 A1 | 5/2005 | Koivukangas et al. | |
| 2005/0143084 A1 | 6/2005 | Cheng et al. | |
| 2006/0217116 A1 | 9/2006 | Cassett et al. | |

FOREIGN PATENT DOCUMENTS

| | | |
|---|---|---|
| EP | 1309214 A1 | 5/2003 |
| EP | 1779592 A1 | 5/2007 |
| JP | 2005509380 A | 4/2005 |
| JP | 2007089006 A | 4/2007 |
| JP | 2008506180 A | 2/2008 |
| KR | 1020040060967 | 7/2004 |
| WO | WO-2003041422 | 5/2003 |
| WO | 2006063309 | 6/2006 |

OTHER PUBLICATIONS

Taiwan Search Report—TW097140733—TIPO—Nov. 2, 2012.

* cited by examiner

| Detailed Fault Report 162 | |
|---|---|
| Communication Device Identifier 174 | |
| Device Fault Report Number 176 | |
| Component Specific Failure Details 164 | |
| Operating System Specific Run Time Information 166 | |
| CPU Stack and Memory Registers 168 | |
| Tasks Running at the Time of Failure 170 | |
| Execution Time Duration until Failure 172 | |
| Date/time of Failure 173 | |
| Location (e.g., GPS coordinates) 175 | |
| ... | |
| Other Fault Related Reporting Data 178 | |

*FIG. 2*

| Enable Collection and Reporting of Fault Data 184 | |
|---|---|
| Communication Device Model(s) 186 | |
| Device Original Equipment Manufacturer (OEM) 188 | |
| Wireless Broadband Service Provider (WBSP) 190 | |
| Billing and Customer Care Provider (BNC) 192 | |
| Wireless Multicast Service Provider (WMSP) 194 | |
| Mobile Application Version Number(s) 196 | |
| Severity of Fault(s) 198 | |
| Fault Collection Window 200 | |
| Fault Log UploadWindow 202 | |
| ... | |
| Other Fault Reporting Parameters 204 | |

*FIG. 3*

FIELDED DEVICE FAILURE TRACKING AND RESPONSE

BACKGROUND

1. Field

Aspects disclosed herein pertain to a communication system that selectively collects and analyzes fault data from a population of mobile communication devices, and in particular discriminates fault collection and reporting to particular software and hardware components of a mobile computing platform.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. Consumers are increasingly offered many types of electronic devices that can be provisioned with an array of software applications. Distinct features such as email, Internet browsing, game playing, address book, calendar, media players, electronic book viewing, voice communication, directory services, etc., increasingly are selectable applications that can be loaded on a multi-function device such as a smart phone, portable game console, or hand-held computer.

Even with these advances, mobile communication devices tend to have communication bandwidth, processing, and user interface constraints over general purpose computing devices. For example, the screen size, amount of available memory and file system space, amount of input and output capabilities and processing capability may each be limited by the small size of the device. Because of such severe resource constraints, the computing platforms for such devices are often optimized for a particular telephone chipset and user interface hardware. As such, generally applicable solutions are typically not suitable to a population of wireless mobile devices.

Despite these challenges, today most of the mobile/wireless devices have the capabilities to access various wireless broadband networks. In fact, the rapid advances in technology, mass market adoption, standardization, and globalization enabled various companies to collaborate in bringing innovate and compelling services to the market. This collaboration led to the formation of a wireless/mobile service "Eco System" consisting of radio access network (RAN) technology providers, mobile computing platform providers, mobile device manufactures (aka original equipment manufacturers (OEMs), and wireless broadband service providers (WBSP). With the advent of wireless multicast systems (e.g., Forward Link Only (FLO) and Digital Video Broadcast-Handheld (DVB-H)) and their convergence with wireless broadband systems, the Eco System is growing further with Wireless Multicast Service Providers (WMSP) that distribute for content providers.

While the Eco System is able to provide compelling services such as mobile television, mobile Internet etc., the mobile computing platforms/devices that are necessary for accessing these services require complex technology integration from various players in the Eco System. Due to the pace of innovation, competition and other market forces, there is an enormous pressure on Eco System partners to bring new products and services to market. This is leading to shorter cycle time to market and increased expectations on the reliability of the services, applications and devices. Testing processes to ensure reliability and quality of various mobile/wireless devices, services and (or) applications before launching to market has become quite complex. Moreover simulating all kinds of field failure conditions in the lab environment does not provide adequate infrastructure to find the latent bugs that cause failures in the hardware and software systems besides consuming time and resources. However the Eco System partners are faced with critical decisions often without adequate testing or data which is critical to establish the reliability of the hardware and software.

After the mobile device or application or service is launched, often latent bugs are manifested in field conditions resulting the following issues: (a) increase call volume due to customer complaints; (b) inability to troubleshoot and isolate the actual bugs due to inadequate information to duplicate the conditions that resulted in the failure; (c) increased time to isolate bugs and assign ownership; (d) lost revenue due to increased churn of subscribers; (e) recalling large number of devices causing lost revenue for all the players in the Eco System; and (f) poor customer satisfaction.

However, the wireless/mobile devices and the communication networks that service them are still constrained by the capabilities available to address the problem. Excessive emphasis on isolating bugs can come at the expense of the performance of these devices to perform their intended functions, also causing reduction in quality of service and performance, and thus customer satisfaction for devices that are not malfunctioning.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

In one aspect, a method is provided for reporting fault data to a provider of wireless data communication to a wireless mobile device that logs fault data sufficient for diagnosis of a responsible component among a plurality of components when a fault condition occurs. In particular, logging fault data for each vertical software layer is sufficient for diagnosis of a responsible component among a plurality of components comprising at least one software component residing on a first software vertical layer and a second software component residing on a second software vertical layer in response to a fault condition. Thus, when a fault reporting enabling event is received, the wireless mobile device reports the logged fault data to a wireless data communication provider for diagnosis to the responsible component. Thereby the limited resources of a wireless data communication network are efficiently used; yet helpful fault data from fielded wireless mobile devices is available to pinpoint a cause of otherwise difficult to duplicate failures as well as the overall prevalence and severity of the fault.

In other aspects, a processor, computer product, and an apparatus each provide means for performing the method for reporting fault data.

In yet an additional aspect, a computer-implemented apparatus for reporting fault data to a provider of wireless data communication has a computing platform executing a plurality of components. A fault diagnostic logging component logs fault data sufficient for diagnosis of a responsible component among the plurality of components in response to a fault condition. In particular, logging fault data for each vertical software layer is sufficient for diagnosis of a responsible component among a plurality of components comprising at least one software component residing on a first software vertical layer and a second software component residing on a second software vertical layer in response to a fault condition. A data receiver can receive a fault reporting enabling event whereupon a transmitter wirelessly reports the logged fault data to a wireless data communication provider for diagnosis to the responsible component.

In another aspect, a method for collecting and analyzing fault data from a plurality of wireless communication devices begins with sending a fault reporting enabling event to a wireless communication device for logging fault data for each vertical software layer sufficient for diagnosis of a responsible component among a plurality of components comprising at least one software component residing on a first software vertical layer and a second software component residing on a second software vertical layer in response to a fault condition. Then wirelessly receiving the logged fault data reported by the wireless communication device allows for diagnosing the responsible component for the fault condition.

In other aspects, a processor, computer product and apparatus provide means for performing the method for collecting and analyzing data.

In yet a further aspect, a computer-implemented apparatus for collecting and analyzing fault data from a plurality of wireless communication devices has a fault collection enabling component that wirelessly sends a fault reporting enabling event to a wireless communication device for logging and reporting fault data. A data communication receiver wirelessly receives the logged fault data reported by the wireless communication device. In particular, logging fault data for each vertical software layer is sufficient for diagnosis of a responsible component among a plurality of components comprising at least one software component residing on a first software vertical layer and a second software component residing on a second software vertical layer in response to a fault condition. In addition, a fault diagnostic component determines the responsible component for the fault condition among a plurality of components in response.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

BRIEF DESCRIPTION OF THE DRAWINGS

FIG. 2 is a diagram of a data structure for detailed fault reporting.

FIG. 3 is a diagram of a data structure for enabling collection and reporting of fault data.

DETAILED DESCRIPTION

A fault remediation system for fielded wireless mobile devices addresses field failure data collection, consolidation of field failure data, and an information services platform so that the players in a wireless/mobile broadcast/broadband application/service value chain to respond to field failure problems in a consistent and automated manner from wireless/mobile devices over wireless multicast and or wireless broadband networks. An elegant and extremely flexible mechanism enables the failure data collection from a targeted set of wireless/mobile devices. In addition, sophisticated mechanisms identify targeted set of devices that should participate in field failure data collection based on user specified operational requirements (e.g., selected OEM, device configuration type, subscribers to a specific wireless broadband serve, failure occurrence certain time limits, etc.). The fault data logging on the mobile device is vertically integrated to allow diagnosis and assignment to a responsible party for fixing, testing, and release with subsequent certification and deployment.

In addition, the system provides the capability for dynamic adaptation of field failure alert mechanisms based on the number failure intensity, severity and many other parameters. Also the system provides mechanism to consolidate all the failure events from various devices and provides insight into the reliability of the software/hardware based on the severity of the failures, and time to fail parameters which helps the value-chain partners in guiding their tests in the lab to deliver reliable hardware and software for the mobile/wireless devices which enhances the customer experience.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describing these versions.

The apparatus and methods are especially well suited for use in wireless environments, but may be suited in any type of network environment, including but not limited to, communication networks, public networks, such as the Internet, private networks, such as virtual private networks (VPN), local area networks, wide area networks, long haul networks, or any other type of data communication network.

Figure 1:
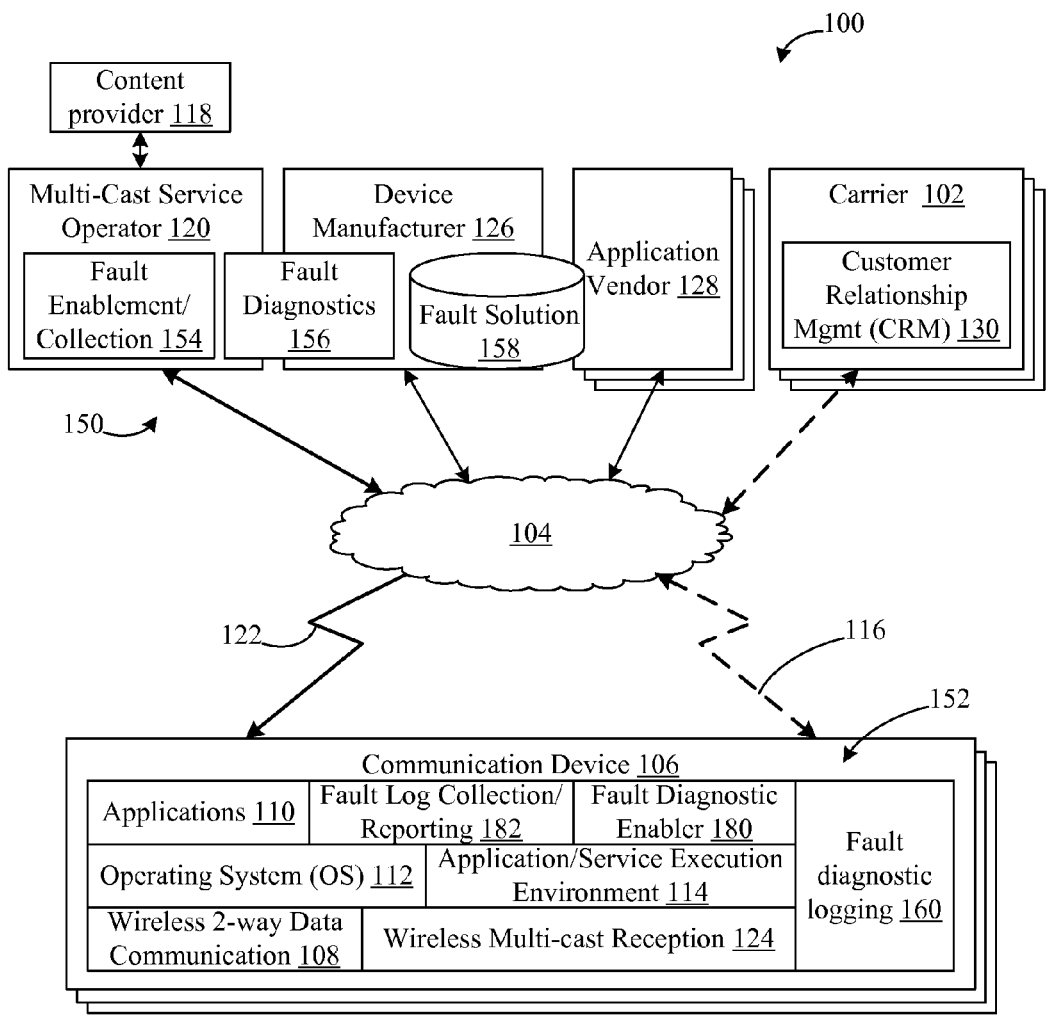
FIG. 1 is a block diagram of a communication system that utilizes a distributed and selective fault remediation system to efficiently diagnose faults in a fielded population of communication devices.

Referring to FIG. 1, a communication system 100 enables a carrier 102 to provide two-way wireless communication services across a network 104 to a population of wireless communication devices 106, which in turn communicates via a wireless two-way data communication transceiver 108. Each communication device 106 executes a number of applications 110 supported by an operating system 112, leveraging the data communication as well as performing other standalone features. Some of these applications 110 are further supported by an application/service execution environment 114.

The two-way data communication provides considerable benefit to the communication devices 106. However, receipt of media content (e.g., images, video, audio, downloaded applications, etc.) can easily burden the available throughput of a wireless communication channel, depicted at 116. This is especially true when a large number of users choose to access large files simultaneously from a content provider 118 via the carrier 102. Multicasting provides an economical way to extend media content services. In particular, a multicast service operator 120 simultaneously sends content, depicted at 122, to a multiple number of communication devices 106, each receiving the content with a wireless multicast reception component 124.

Typically, the population of communication devices 106 is challenged by a number of factors. First, a number of entities are responsible for the hardware and software integrated into each communication device 106. For example, a device manufacturer 126 develops or is otherwise responsible for the hardware (e.g., portions of the wireless two-way data communication) and some software (e.g., operating system 112). Application vendors 128 can be responsible for certain applications 110. The carrier 102 can also be responsible for some applications 110, as well as the robustness and quality of service (QoS) for the communication channel 116. In addition, the multicast service operator 120 can be responsible for the portions of the communication device 106, such as the wireless multicast reception component 124, the application/service execution environment 114. A system fault can be caused solely by one of these components of the communication device 106 without an indication of which component it is, or incompatibilities between components can create a failure.

Second, another challenge for such an integrated device is that various communication devices 106 can have a different hardware and/or software configuration from the others. Some of the software can manifest faults or failures on certain devices 106 only. Third, the universe of possible configurations, and thus possible permutations of configurations, goes up given the ease in which communication devices 106 can be individually configured to suit the needs of the user, such as by installing/activating certain applications or features. Fourth, since many of the communication devices 106 are advantageously portable, the respective communication link 116 made to the carrier 102 can suffer by localized problems that are a problem in and of themselves or expose a weakness or fault in the software.

Without other fault diagnostic tools, a user of a communication device 106 that encounters a failure contacts customer relationship management (CRM) 130 of the carrier 102. Often the carrier 102 provides the device 106 from the device manufacturer 126 as well as offering the additional services of multicasting by multicast service operator 120. As such, the carrier 102 tends to be the recipient of user complaints. However, given that the CRM 130 may not have any insights into the cause of the failure, the carrier 102 may be limited in what solutions to the problem can be offered.

Advantageously, the communication system 100 includes a selective fault remediation system 150 distributed among certain entities, depicted in the illustrative version as including fault detection, collection and reporting software 152 on the communication device 106 networked to a fault enablement/collection component 154, a fault diagnostics component 156, and a fault solution database 158.

In one aspect, a fault diagnostic logging component 160 of the fault detection, collection and reporting software 152 on the communication device 106 is responsible for logging detailed fault reports. The logging component 160 is vertically integrated such that information is sufficient to diagnose the cause of the fault. The logging component 160 may be distributed and portions may reside in different portions of the communication device 160 depending up on the software and hardware architecture or a specific implementation mechanism. The logging component 160 has means to quickly and persistently store the detailed fault information, especially since the fault could cause shutdown or restart the communication device 106.

In FIG. 2, an illustrative set of fault data fields are depicted in a data record 162 that contain information detected and stored by the fault logging component 160 of FIG. 1. It should be appreciated that this listing is neither all inclusive nor encompassing necessarily required data fields, but rather depends upon what minimal set of critical data elements is determined to be required for troubleshooting of field failures. The data structure 162 is depicted as including component specific failure details field 164, which could be a particular interrupt that occurred indicative of a fault or failure condition (e.g., watchdog timer timed out, application not responding, etc.). A data field 166 contains operating system specific run time information. A data field 168 contains central processing unit (CPU) stack and memory registers. A data field 170 contains tasks running at the time of the failure. A data field 172 contains a duration time value for how long the device or process had been executing before the fault/failure occurred. A data field 173 contains a date/time for when the fault/failure occurred. The data record 162 can contain identifying information such as a data field 174 containing identification for the communication device 106 (FIG. 1). A data field 175 can contain location information that can help determine faults with correlations to a location (e.g., shadowed reception area, interference, etc.). The device can have access to global positioning system (GPS) coordinates, radio frequency identifier (RFID) data provided within a facility, etc. Further, a data field 176 can provide a device fault report number that uniquely identifies this particular fault occurrence to avoid duplicate reporting. Other data fields 178 can be provided to assist in narrowing down the demographics and scenario that led to the fault in order to assist in diagnostics, such as a user input description field. For example, location data (e.g., GPS coordinates) can be included as a data field 178.

Returning to FIG. 1, the fault diagnostic logging component 160 can perform logging with reference to a device settings, such as not logging fault data until user and/or network enabled, automatically overwriting oldest fault data records, selecting a level of detail of fault reports either stored and/or reported, or automatically logging fault data in the event that reporting is enabled later.

In particular, in one aspect, a fault diagnostic enabler component 180 of the fault detection, collection and reporting software 152 may reside on the application layer or it could be a distributed component which enables logging of fault diagnostic information by the fault diagnostic logging component 160 and/or enables/disables reporting of the logged fault diagnostic information. The fault diagnostic enabler component 180 is responsive to the fault enablement/collection component 154 of the selective fault remediation system 150. These commands can be unicast solely to particular communication device 106 or multicast simultaneously to the population of communication devices 106. In one aspect, the fault diagnostic enabler component 180 can receive a signal enabling collection and reporting of fault data with additional parameters specifying the manner of logging and/or reporting and can receive a signal disabling collection and reporting of fault data. To the extent that the fault diagnostic enabler component 180 is responsive to enabling or disabling logging of fault data, this command will be relayed to the fault diagnostic logging component 160. Enablement or disablement of reporting of fault data is relayed to a fault log collection/reporting component 182 to start or stop respectively sending detailed fault logs to the fault enablement/collection component 154 of the fault remediation system 150 or other directed recipients.

In FIG. 3, an illustrative data record 184 or enabling collection and reporting of fault data by the communication device 106 of FIG. 1 includes parameters to specify a subset of communication devices and/or a subset of fault types that are to be reported, thus optimizing utilization of capacity of the communication devices 106 and the overall communication system 100. Examples of parameters include a data field 186 identifying communication device model(s) that should report fault data. A data field 188 specifies communication devices made by one or more OEMs that should report fault data. A data field 190 specifies one or more wireless broadband service providers (WBSP) for which the devices in question may be a subscriber. A data field 192 specifies a billing and customer care provider (BNC) that may be applicable. A data field 194 specifies a wireless multicast service provider (WMSP). A data field 196 specifies version(s) of a mobile application executed by wireless mobile devices. A data field 198 specifies a severity of faults that should be reported, such as for excluding low severity faults or for zeroing in on a particular class of faults associated with an undiagnosed fault thought to have a common cause. A data field 200 specifies a fault collection window which limits fault to those that occur within the time window to be reported. A data field 202 specifies a fault log upload window, which can be chosen to utilize a lower demand state of the communication system 100. Other data fields 204 can specify other criteria, such as whether the criteria provided are to be logically considered in union or intersection.

Returning to FIG. 1, the fault log collection reporting component 182 is responsible for retrieving the fault logs and reports the data by uploading to the fault enablement/collection component 154 or other specified recipient over the two-way wireless communication channel 116. The reporting component 182 may be launched by any mobile applications that runs on the communication device 106 if permitted, such as for other entities (e.g., device manufacturer 126, application vendors 128, etc.) to initiate fault diagnostics. As another example, mobile applications 110 that consume data that is delivered over wireless multicast networks may invoke this reporting component 182 when encountering any failures. As yet another example, an end user can invoke the collection/reporting component 182 through a user interface (not shown) to assist in diagnosing a failure. Moreover, this user initiated reporting can entail wirelessly uploading fault data to a system accessible by the user or for viewing on the user interface so that the reporting can occur verbally to a customer service representative, which can be a person working for a Billing and Customer Care Provider (BNC) or a Customer Relations Manager (CRM).

In an illustrative aspect, the fault remediation system 150, and in particular the fault enablement/collection component 154, has direct access to demographic/subscriber data listed in FIG. 3 for the population of communication devices 106 that can be used to determine a subset of communication devices to be fault enabled and/or to correlate with reported fault data. Thereby, the amount of transmitted data over a limited throughput communication channel 116 is reduced. Alternatively, the fault enablement/collection component 154 is relieved of concerns for privacy in maintaining and/or accessing such a database of information directly related to users of communication devices (e.g., wireless mobile devices) 106 if each fault report volunteers such information.

As another example, another party, such as a carrier 102, can maintain some or all of this demographic/subscriber data, utilizing it for customer relationship management 130 purposes but filtering user identification information for purposes of diagnostics by another entity. For communication devices 106 that do not have location sensing capability, the fault remediation system 150 can access network information indicating the access node through which contact has been made as an approximate location. As another example, for devices reporting GPS coordinates, the fault remediation system 150 can advantageously provided assisted global positioning system (A-GPS) wherein direction finding from the radio access network (RAN) supplements the GPS data.

In an illustrative version, the application/service execution environment 114 is BREW-enabled. The Binary Runtime Environment for Wireless® (BREW®) software, developed by Qualcomm, Inc. of San Diego, Calif., exists over the operating system of a computing device, such as a wireless cellular phone. BREW® software can provide a set of interfaces to particular hardware features found on computing devices. The execution environment 114 may further comprise uiOne delivery system (UDS). The uiOne™ architecture also developed by Qualcomm, Inc. as part of BREW provides a set of BREW extensions that enable rapid development of rich and customizable User Interfaces (UIs) (i.e., active content, over-the-air (OTA) up-gradable), helps to evolve download business beyond applications, provides theming of part or entire handset UI, and utilizes BREW UI Widgets. Thus, BREW uiOne reduces the time to market for handsets, carrier customization, and consumer personalization. To do this, the BREW uiOne provides a clear set of abstractions, adding two new layers to the application development stack for BREW. The uiOne delivery system is used to update communication device UIs over-the-air. This delivery system can be deployed in a standalone fashion, allowing operators to leverage the functionality of their own delivery system. Additional benefits can be realized by deploying uiOne architecture with uiOne delivery system, especially when deployed in conjunction with other elements of the BREW solution (e.g. monetization and billing of downloadable UI packages when the operator does not already have the appropriate infrastructure).

In addition, the multicast service operator 120 utilizes Forward Link Only (FLO) multicasting, also developed by Qualcomm, Inc., which builds upon the BREW execution environment 114. However, it should be appreciated with the benefit of the present disclosure that other multicasting approach, such as Digital Video Broadcasting-Handheld (DVB-H) can also benefit with aspects described herein.

The fault remediation system 150 advantageously optimizes the following considerations and attributes listed in Table 1:

TABLE 1

| Attribute | Description |
| --- | --- |
| Trigger | Method to initiate Fault Data Reporting |
| User Involvement | Informing user and (or) obtaining authorization from user |
| Flexibility | Ability to control Fault Data Collection mechanism |
| Data Overload | The amount data that needs to be processed by either the system or the end user |
| Scalability | The ability of the system to handle the fault data as the user base grows and handset base grows |
| Bandwidth Usage | The amount of bandwidth consumed to upload fault data |
| Central Processing Unit (CPU) Usage | CPU usage for fault diagnostic reporting |

TABLE 1-continued

| Attribute | Description |
|---|---|
| File System Usage | The amount of Disk space need to store fault logs |
| Memory Usage | The amount of memory required by Fault Diagnostic Application when it is uploading fault data |
| Concurrent Processing | The ability to upload fault data without impacting existing applications |
| Complexity of Implementation | The degree of complexity to implement from schedule, resources, testing etc. |
| Radio Access Network(RAN) Dependency | The dependency of Triggering Method up on the underlying RAN network |
| Security | Transmitting sensitive data securely |
| Privacy/Legal | User identifying information constrained by End User License Agreement (EULA)/Terms of Use (ToU), for example retaining such information within the entity in which privity of contract exists with the subscriber and/or requiring explicit user permission prior to reporting (e.g., customer service session). |

Figure 4:
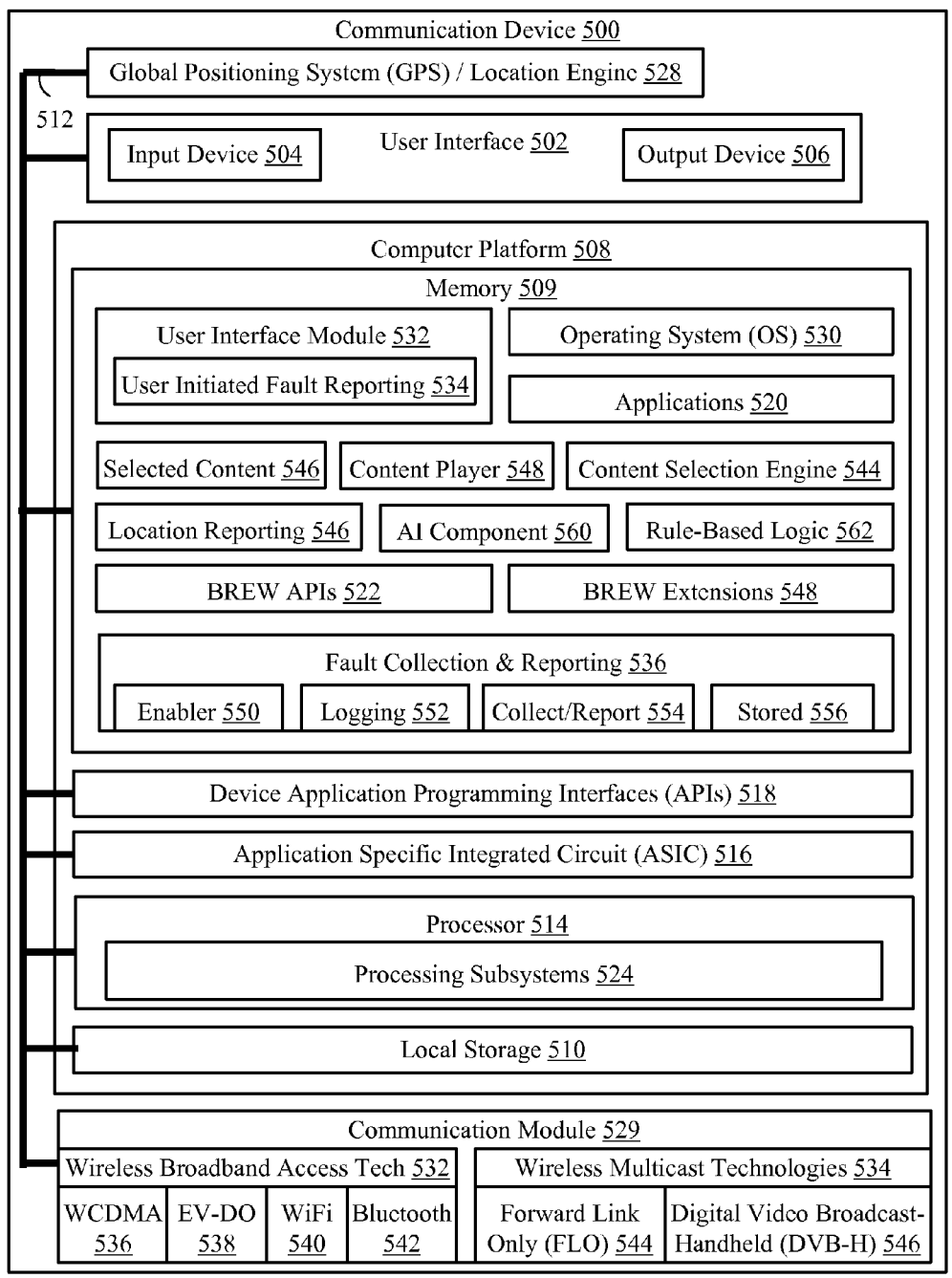
FIG. 4 is a schematic diagram of a communication device of the communication system of FIG. 1.
Figure 5:
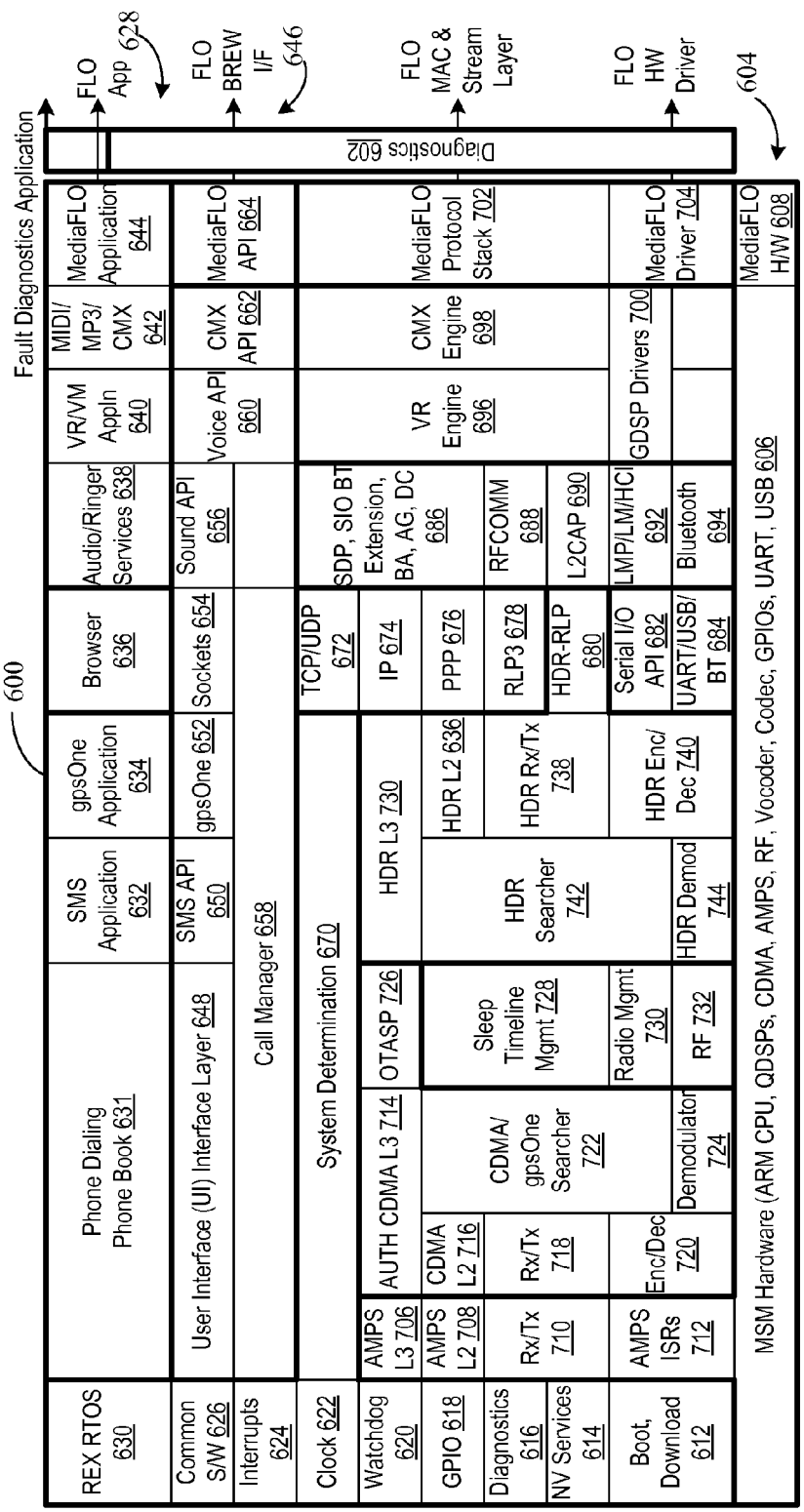
FIG. 5 is an illustrative computing platform of a communication device of FIG. 4.

In FIG. 4, an exemplary version of a communication system 500 is depicted according to some aspects as any type of computerized device. For example, the communication device 500 may comprise a mobile wireless and/or cellular telephone. Alternatively, the communication device 500 may comprises a fixed communication device, such as a Proxy Call/Session Control Function (P-CSCF) server, a network device, a server, a computer workstation, etc. It should be understood that communication device 500 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 500 can be a remote-slave or other similar device, such as remote sensors, remote servers, diagnostic tools, data relays, and the like, which does not have an end-user thereof, but which simply communicates data across a wireless or wired network. In alternate aspects, the communication device 500 may be a wired communication device, such as a landline telephone, personal computer, set-top box or the like. Additionally, it should be noted that any combination of any number of communication devices 500 of a single type or a plurality of the afore-mentioned types may be utilized in a cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 500 may include a user interface 502 for purposes such as viewing and interacting with advertisements. This user interface 502 includes an input device 504 operable to generate or receive a user input into the communication device 500, and an output device 506 operable to generate and/or present information for consumption by the user of the communication device 500. For example, input device 502 may include at least one device such as a keypad and/or keyboard, a mouse, a touch-screen display, a microphone in association with a voice recognition module, etc. Further, for example, output device 506 may include a display, an audio speaker, a haptic feedback mechanism, etc. Output device 506 may generate a graphical user interface, a sound, a feeling such as a vibration or a Braille text producing surface, etc.

Further, communication device 500 may include a computer platform 508 operable to execute applications to provide functionality to the device 500, and which may further interact with input device 504 and output device 506. Computer platform 508 may include a memory, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media, optical media, tape, soft and/or hard disk, and removable memory components. In the illustrative version, memory is depicted as RAM memory 509 and a non-volatile local storage component 510, both connected to a data bus 512 of the computer platform 508.

Further, computer platform 508 may also include a processor 514, which may be an application-specific integrated circuit (ASIC), or other chipset, processor, logic circuit, or other data processing device. In some aspects, such as when communication device 500 comprises a cellular telephone, processor or other logic such as an application specific integration circuit (ASIC) 516 may execute an application programming interface (API) 518 that interfaces with any resident software components, depicted as applications (e.g., games) 520 that may be active in memory 509 for other functions (e.g., communication call control, alarm clock, text messaging, etc.). It should be appreciated with the benefit of the present disclosure that applications consistent with aspects of the present invention may omit other applications and/or omit the ability to receive streaming content such as voice call, data call, and media-related applications in memory 509. Device APIs 518 may be a runtime environment executing on the respective communication device. One such API 518 runtime environment is BREW API 522.

Additionally, processor 514 may include various processing subsystems 524 embodied in hardware, firmware, software, and combinations thereof, that enable the functionality of communication device 500 and the operability of the communication device 500 on communications system 100 (FIG. 1). For example, processing subsystems 524 allow for initiating and maintaining communications, and exchanging data, with other networked devices as well as within and/or among components of communication device 500. In one aspect, such as in a cellular telephone, processor 514 may include one or a combination of processing subsystems 524, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 524 of processor 514 may include any subsystem components that interact with applications executing on computer platform 508.

Computer platform 508 may further include a GPS engine 528 or other location sensing components provide location information of the communication device 500.

A communications module 529 that enables communications among the various components of communication device 500, as well as being operable to communications related to receiving enablement/disablement fault logging/reporting commands and reporting fault logs. Communications module 529 may be embodied in hardware, firmware, software and/or combinations thereof, and may further include all protocols for use in intra-device and inter-device communications. In one aspect, the communication module 529 includes a wireless broadband access technology portion 532 and a wireless multicast technology portion 534. The two-way wireless broadband access technology portion 532 can include one or more of a wireless code division multiple access (W-CDMA) component 536, an Evolution-Data Optimized (EV-DO) component 538, an IEEE 802.11 (i.e., often mischaracterized by the trademark WiFi) component 540, and a Bluetooth component 542. The wireless multicast technology portion can include for example a Forward Link Only (FLO) component 544 and/or a Digital Video Broadcast-Handheld (DVB-H) component 546.

Certain of these capabilities of the communication device 500 can be facilitated by code loaded from local storage 510, retained in memory 509, and executed by the processor 514, such as an operating system (OS) 530. A user interface (UI) module 532 facilitates interactive control with the user interface 502. The UI module 532 includes a user initiated fault reporting module 534 that provides tailored interaction options for enabling fault logging or to view or report fault logs by interacting with a fault collection and reporting module 536. Applications 538 can be the cause of faults/failures, as well as other components of the computer platform 508. A location reporting component 540 can include logic that selectively reports device location.

The BREW APIs 522 provide the ability for applications to call Device APIs 518 and other functions without having to be written specifically for the type of communication device 500. Thus, applications 538, if composed in BREW, or other software components on the communication device 500 may operate identically, or with slight modifications, on a number of different types of hardware configurations within the operating environment provided by BREW API 522, which abstracts certain hardware aspects. A BREW extension 542 adds additional capability to the programming platform of the BREW API 522, such as offering MP3 players, Java Virtual Machines, etc. As an example, the UI module 532 can be a brew extension 542.

In the illustrative version, the multicast capability of the wireless multicast technologies portion 534 are leveraged to provide media content for presentation on the user interface 502 and are depicted by a content selection engine 544, a selected content cache 546, and a content player 548.

The fault collection and reporting component 536 further comprises an enabler component 550, a logging component 552, a collect/report component 554, and a stored fault data structure 556.

In order to distribute computational overhead and/or to reduce transmission overhead on the communication system 100 (FIG. 1), an artificial intelligence (AI) component 560 and/or a rule-based logic component 562 can infer user behavior for reporting, make decisions as to when a reportable fault related event has occurred, and/or extrapolate location based on intermittent location sensing, etc, or to diagnose the cause of a failure.

The rules-based logic component 562 can be employed to automate certain functions described or suggested herein. In accordance with this alternate aspect, an implementation scheme (e.g., rule) can be applied to define types of attributes that should be acted upon or ignored, create rules that are aware of location sensing status, performance delays in certain components of the computing platform that would be deemed by the user to be a failure or poor performance, etc. By way of example, it will be appreciated that the rule-based implementation can automatically define criteria for severity of a fault.

The AI component 560 can facilitate automating performance of one or more features described herein such as learning what is normal and abnormal performance of a wireless mobile device, perhaps before and after a change in software installed or executed, extrapolating intermittent location data, adjusting user feedback provided to a user based on machine learning. Thus, employing various AI-based schemes can assist in carrying out various aspects thereof.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria.

Figure 6:
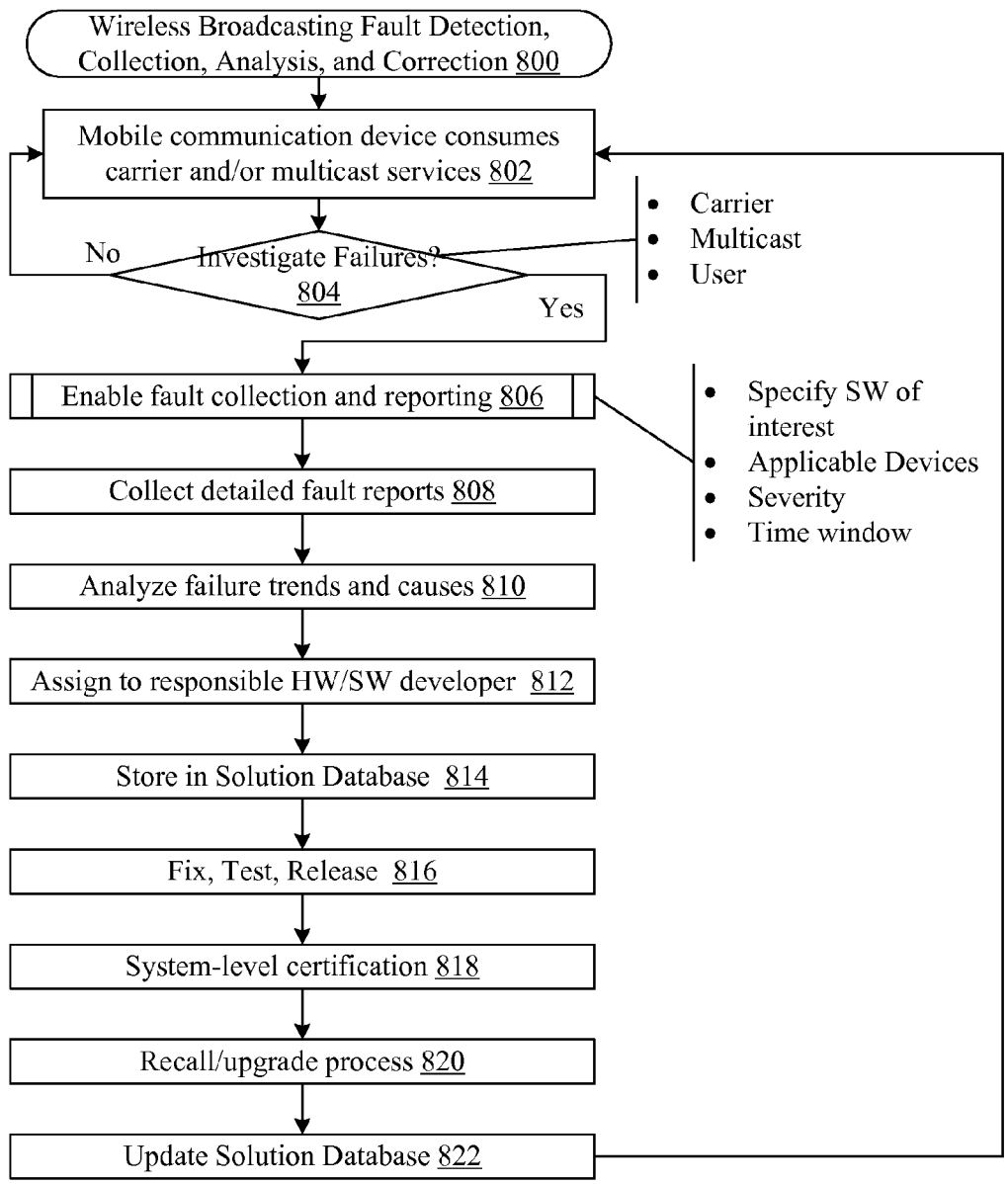
FIG. 6 is a flow diagram of a methodology for wireless broadcasting fault detection, collection, analysis and correction performed by the communication system of FIG. 1.

In FIG. 6, an illustrative aspect depicts a computer platform 600 of a wireless mobile device with layered software components whose faults are vertically monitored, logged and reported by a fault diagnostics portion 602. The software components of the computing platform 600 build upon a physical layer 604. In an illustrative version, the physical layer 604 can comprise two-way data communication capabilities as part of a Mobile Station Modem™ (MSM™) chipsets, including an ARM CPU, Qualcomm digital signal processing (QDSP), code division multiple access (CDMA) hardware, AMPS, Radio Frequency (RF) components, vocoder, codec, general purpose input/output (GPIO) hardware, universal asynchronous receiver/transmitter (UART), universal serial bus (USB), etc., 606. The hardware layer 604 advantageously includes MediaFLO hardware 608 for receiving a multicast.

A set of system components 610 provide a vertical stack of capabilities beginning with a bottom-most boot/download component 612, then nonvolatile memory (NV) services 614, system diagnostics 616, general purpose I/O interfaces 618, a watchdog timer 620, system clock 622, interrupt handling 624, common software 626, and at a horizontal top-most applications layer 628 a Rex Real-time Operating System (RTOS) 630.

Other software components of the applications layer 628 include a phone dialing phone book application 631, a Short Messaging Service application 632, a gpsOne Application 634 for A-GPS, an Internet browser for wireless mobile devices 636, audio/ringer services 638, a voice response/voice message (VR/VM) 640, a MID/MP3 CMX (Compact Media Extensions) 642 by Qualcomm for multimedia applications, and a MediaFLO application 644.

A presentation layer 646 of the computing platform 600 includes a UI interface layer 648 beneath the phone book 631, an SMS API 650 beneath the SMS application 632, a gpsOne API 652 beneath gpsOne application 634, sockets 654 beneath browser 636, and a sound API 656 beneath the audio/ringer services 638, which in turn build upon a call manager 658. The presentation layer 646 also includes a voice API 660 supporting the VR/VM application 640, a CMX API 662 supporting the MIDI/MP3/CMX application 642, and a MediaFLO API 664 supporting the MediaFLO application 644. A system determination component 670 supports the call manager 658.

To continuing down from the browser 636, transport control protocol/user datagram protocol (TCP/UDP) component 672 supports the sockets 658/call manager 658, then an Internet Protocol (IP) component 674, a point-to-point protocol 676, a radio link protocol 3 component 678, then a high data rate (HDR)—radio link protocol (RLP) component 680, a serial I/O API 682, and then to a UART/USB/BT interface 684.

Moving down from audio/ringer services 638 and sound API 656, an SDP, SIO BT extension, BA, AG, DC component 686 builds upon an RF communication (RFCOMM) component 688, then an L2CAP component 690, then an LMP/LM/HCI component 692, then a Bluetooth component 694.

The voice API 660 is supported by a VR engine 696. The CMX API 662 is supported b a CMX engine 698. The VR and CMX engines 696, 698 are supported by QDSP drivers 700.

The MediaFLO API 664 is supported by a MediaFLO Protocol Stack component 702, which in turn is supported by a MediaFLO driver 704. The MediaFLO application 644 supports other FLO applications (not shown) as well as other fault diagnostic applications (not shown). The MediaFLO API 664 services as a FLO BREW interface. The MediaFLO protocol stack 702 serves as FLO medium access control (MAC) and stream layer. The MediaFLO driver 704 serves a FLO hardware driver.

Other software components of the computing platform 600 include an AMPS L3 component 706, an AMPS L2 component 708, a receive/transmit (Rx/Tx) component 710, then an AMPS interrupt service routine (ISR) component 712. An AUTH CDMA L3 component 714 is supported by a CDMA L2 component 716, an Rx/Tx component 718, and an Encoder/Decoder (Enc/Dec) 720 as well as a CDMA/gpsOne searcher component 722 and demodulator 724. There is an Over The Air Service Provisioning (OTASP) component 726, sleep timeline management component 728, radio management component 730, and RF component 732. Also provided are an HDR L3 component 734, HDR L2 component 736, HDR Rx/Tx component 738, HDR Enc/Dec component 740, HDR searcher component 742, and HDR demodulator 744.

In FIG. 6, a methodology 800 for wireless broadcasting fault detection, collection, analysis and correction includes in block 802 a population of wireless mobile devices that consume carrier and/or multicast services. A determination is made that an investigation is to be made into failures in block 804. This could be a default setting of the device to do fault logging and reporting. This could be a user initiated investigation. This could be a carrier initiated investigation (e.g., SMS enablement) and/or a multicast provider initiated.

In block 806, the fault collection and reporting is enabled, with one implementation discussed below with regard to FIG. 7. Detailed fault reports 808 are collected in block 808 in accordance with parameters or criteria specified in the fault enablement reporting event of block 806. For example, software components, applicable devices, fault severity, and/or time window for fault collection can be specified. In block 810, the reported fault data is analyzed for failure trends and causes. The amount of enabled fault reporting can be adjusted as the problem is better understood. Once a cause of a failure is attributed to a particular component or interaction between components, a responsible hardware/software developer for that component is assigned responsibility for the failure in block 812. The preliminary results are stored in a solution database in block 814 to assist other entities in the value chain that may be getting queries from users or developers. In block 816, the responsible developer performs a fix, tests the fix and releases the fix. A system-level certification is performed on the fix 818 to avoid integration issues that could be introduced by the fix. Depending on the applicability of the fix, a recall/upgrade process in block 820 is initiated to introduce the fix to fielded and to new devices. Then the final solution updates the solution database in block 822.

Figure 7:
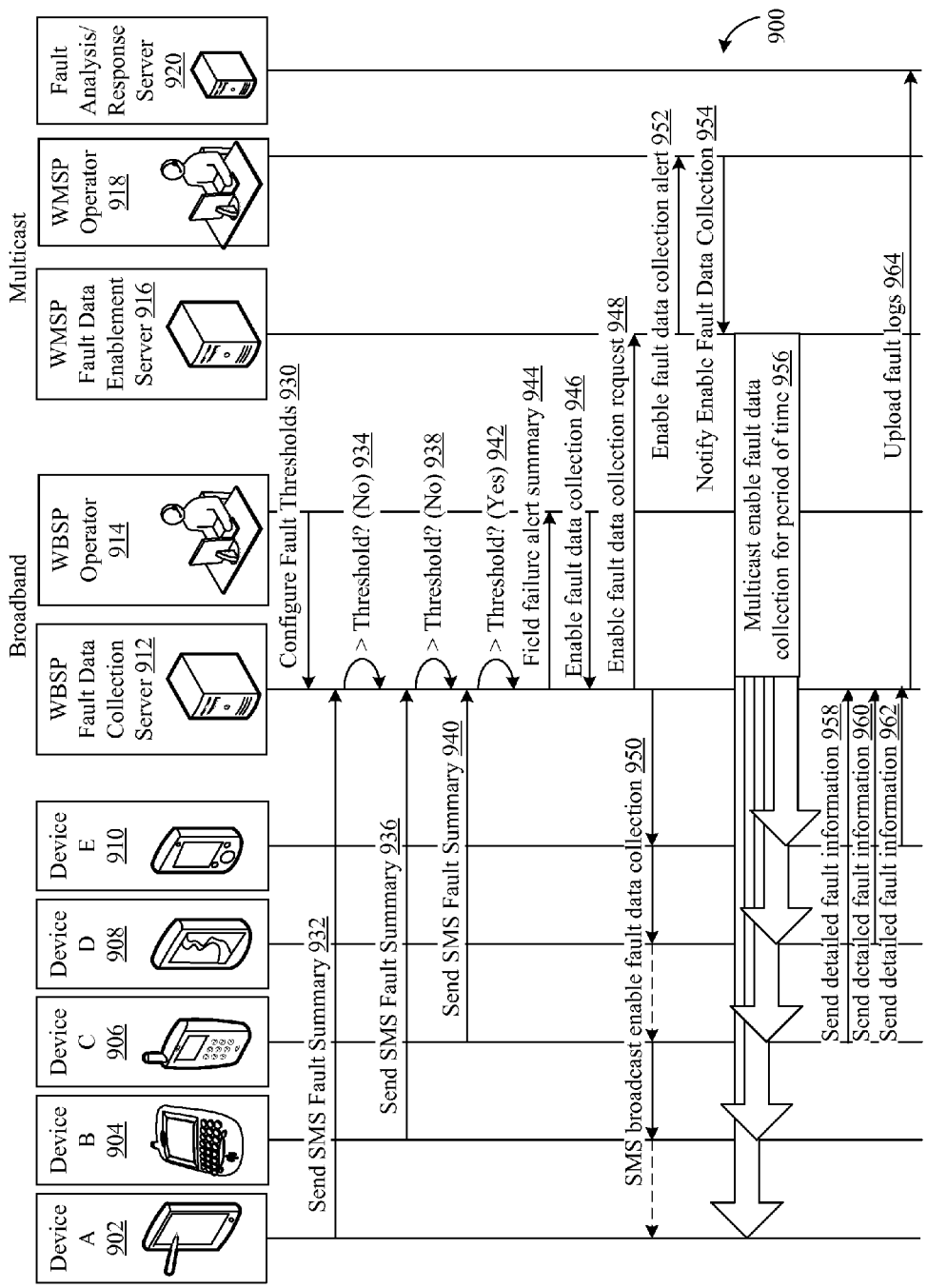
FIG. 7 is a timing diagram of a communication system monitoring and enabling fault data reporting from a population of wireless mobile devices.

In FIG. 7, an illustrative fault enablement methodology 900 is depicted as a timing diagram including a population of wireless mobile devices A-E, 902-910, a wireless broadband service provider (WBSP) represented by a WBSP fault data collection server 912 and a WBSP operator 914, and a wireless multicast service provider (WMSP) represented by WMSP fault data enablement server 916 and WBSP operator 918. One or more fault analysis/response servers 920 diagnose the fault data collected and could be located at either or both of the WBSP, WMSP as well as an OEM, application vendors, etc.

At 930, the WBSP operator configures the WBSP fault data collection server 912 with thresholds that when triggered cause an alert of a needed fault enablement action. In the aspect as illustrated, some or all of the wireless mobile devices 902-910 can send a summary failure data message, such as by SMS, either automatically or user initiated. Although only a fraction of the devices with faults may send such a summary, these reports can create an alert regarding a problem in the fielded devices. This is depicted as wireless mobile device A 902 sending an SMS fault summary at 932 to the WBSP fault data collection server 912, which in turn determines that this report has not cumulatively exceeded a threshold at 934. Then wireless mobile device B 904 sends an SMS fault summary at 936 to the collection server 912, which again determines that this report has not cumulatively exceeded a threshold at 938. However, when wireless mobile device C 906 sends an SMS fault summary at 940, the collection server 912 determines that the threshold has been exceeded at 942 and sends a field failure alert summary at 944 to the WBSP operator 914. Based upon an assessment of generally what type of field failure data may be needed to diagnose the failure, the WBSP operator 914 sends an enable fault data collection instruction at 946 to the WBSB fault data collection server 912.

It should be appreciated with the benefit of the present disclosure that the SMS message may be saved for later sending until the next time that the SMS is invoked if currently not in reception range. As another alternatively, the SMS message may be relayed through a backend process such as through a customer service representative assisting to troubleshoot a device, especially not capable of wirelessly relaying the fault data.

In the illustrative version, the ability to wirelessly multicast the fault enablement reporting event to some or all of the wireless mobile devices 902-910 has advantages in reaching these devices 902-910 as well as not detrimentally impacting the wireless communication channel as compared to individual messages. To that end, the WBSP fault data collection server 912 sends an enable fault data collection request at 948 to the WMSP fault data enablement server 916, which in turn relays an enable fault data collection alert at 952 to the WMSP operator 918. If the request is in order, the WMSP operator 918 sends a notify enable fault data collection command at 954 to the WMSP fault data enablement server 916.

Thereby, multicasting of a fault reporting enabling event depicted at 956 is sent to the population of mobile wireless devices 902-910, which may continue for a period of time to saturate the population. It should be appreciated that sequencing of communication to individual mobile devices is not necessary and that in some applications sufficient coverage may occur with a single broadcast. In some applications, a higher penetration can be desirable and achieved through repeated broadcasts.

In the event that multicasting is not available to some of the mobile devices 902-910, the WBSP fault data collection server 912 can send SMS broadcast enable fault data collection messages depicted at 950, although reception difficulties could cause certain devices 902, 906 not to receive this SMS enablement.

Thus enabled for fault reporting, when mobile device C 906 encounters a fault, a detailed fault information report depicted at 958 is sent to the WBSP fault data collection server 912. Similarly, when mobile device D 908 encounters a fault, a detailed fault information report depicted at 960 is sent to the WBSP fault data collection server 912. When mobile device E 910 encounters a fault, a detailed fault information report depicted at 962 is sent to the WBSP fault data collection server 912, which in turn uploads the fault logs as depicted at 964 to the fault analysis/response server 920 for diagnosis.

It should be appreciated that aspects described herein segregate certain functions for network-level storage and processing and other functions for performance by a mobile communication device. It should be appreciated with the benefit of the present disclosure that applications consistent with aspects can include configurations with more distributed processing to reduce computational overhead at a centralized location and/or reduce communication loads. Alternatively, some limited capability mobile devices can be served with mobile advertising with additional processing centralized.

The various illustrative logics, logical blocks, modules, and circuits described in connection with the versions disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for reporting fault data to a provider of wireless data communication, comprising:
    logging fault data, in response to a fault condition, from a hardware layer and a plurality of vertical software layers that include a first vertical software layer and a second vertical software layer,
        wherein the logged fault data identifies a component responsible for the fault condition from among a plurality of components,
        wherein the plurality of components include a hardware component residing on the hardware layer, a first software component residing on the first vertical software layer, and a second software component residing on the second vertical software layer, and
        wherein the first software component directly interacts with the hardware component and the second software component interacts with the hardware component via the first software component;
    receiving a fault reporting enabling event; and
    wirelessly reporting the logged fault data to a wireless data communication provider for diagnosis of the responsible component.

2. The method of claim 1, further comprising receiving a wireless multicast signal containing the fault reporting enabling event.

3. The method of claim 2, further comprising wirelessly reporting the logged fault data when satisfying a filtering criteria of the fault reporting enabling event.

4. The method of claim 3, further comprising wirelessly reporting the logged fault data when satisfying the filtering criteria of fault severity.

5. The method of claim 3, further comprising wirelessly reporting the logged fault data when satisfying the filtering criteria of a device type.

6. The method of claim 3, further comprising wirelessly reporting the logged fault data when satisfying the filtering criteria of being a subscriber to a selected wireless service provider.

7. The method of claim 3, further comprising wirelessly reporting the logged fault data when satisfying the filtering criteria of a time window.

8. The method of claim 1, further comprising wirelessly reporting a summary of the logged fault data to the wireless data communication provider prior to receiving the fault reporting enabling event.

9. The method of claim 1, further comprising receiving a wireless unicast signal containing the fault reporting enabling event.

10. The method of claim 1, wherein the plurality of components include a plurality of software components each developed respectively by a wireless multicast provider, an original equipment manufacturer, a carrier of two-way data communication, and an application vendor.

11. The method of claim 1, further comprising reporting a sensed location associated with the occurrence of the fault condition.

12. At least one processor configured to report fault data to a provider of wireless data communication, comprising:
 a first module for logging fault data, in response to a fault condition, from a hardware layer and a plurality of vertical software layers that include a first vertical software layer and a second vertical software layer,
  wherein the logged fault data identifies a component responsible for the fault condition from among a plurality of components,
  wherein the plurality of components include at least a hardware component residing on the hardware layer, a first software component residing on the first vertical software layer and a second software component residing on the second vertical software layer, and
  wherein the first software component directly interacts with the hardware component and the second software component interacts with the hardware component via the first software component;
 a second module for receiving a fault reporting enabling event; and
 a third module for wirelessly reporting the logged fault data to a wireless data communication provider for diagnosis of the responsible component.

13. A computer program product, comprising:
 a non-transitory computer-readable medium comprising:
  a first set of codes for causing a computer to log fault data, in response to a fault condition, from a hardware layer and a plurality of vertical software layers that include a first vertical software layer and a second vertical software layer,
   wherein the logged fault data identifies a component responsible for the fault condition from among a plurality of components,
   wherein the plurality of components include at least a hardware component residing on the hardware layer, a first software component residing on the first vertical software layer and a second software component residing on the second vertical software layer, and
   wherein the first software component directly interacts with the hardware component and the second software component interacts with the hardware component via the first software component;
  a second set of codes for causing the computer to receive a fault reporting enabling event; and
  a third set of codes for causing the computer to wirelessly report the logged fault data to a wireless data communication provider for diagnosis of the responsible component.

14. An apparatus for reporting fault data to a provider of wireless data communication, comprising:
 means for logging fault data, in response to a fault condition, from a hardware layer and a plurality of vertical software layers that include a first vertical software layer and a second vertical software layer,
  wherein the logged fault data identifies a component responsible for the fault condition from among a plurality of components,
  wherein the plurality of components include at least a hardware component residing on the hardware layer, a first software component residing on the first vertical software layer, and a second software component residing on the second vertical software layer, and
  wherein the first software component directly interacts with the hardware component and the second software component interacts with the hardware component via the first software component;
 means for receiving a fault reporting enabling event; and
 means for wirelessly reporting the logged fault data to a wireless data communication provider for diagnosis of the responsible component.

15. A computer-implemented apparatus for reporting fault data to a provider of wireless data communication, comprising:
 a computing platform executing a plurality of components;
 a fault diagnostic logging component logging fault data, in response to a fault condition, from a hardware layer and a plurality of vertical software layers that include a first vertical software layer and a second vertical software layer,
  wherein the logged fault data identifies a component responsible for the fault condition from among the plurality of components,
  wherein the plurality of components include at least a hardware component residing on the hardware layer, a first software component residing on the first vertical software layer, and a second software component residing on the second vertical software layer, and
  wherein the first software component directly interacts with the hardware component and the second software component interacts with the hardware component via the first software component;
 a data receiver receiving a fault reporting enabling event; and
 a transmitter wirelessly reporting the logged fault data to a wireless data communication provider for diagnosis of the responsible component.

16. The computer-implemented apparatus of claim 15, further comprising a wireless two-way data communication transceiver and a wireless multicast reception component.

17. The computer-implemented apparatus of claim 15, further comprising a fault reporting component responsive to the fault reporting enabling event to wirelessly report the logged fault data when satisfying a filtering criteria of the fault reporting enabling event.

18. The computer-implemented of claim 17, further comprising the fault reporting component wirelessly reporting the logged fault data when satisfying the filtering criteria of fault severity.

19. The computer-implemented of claim 17, further comprising the fault reporting component wirelessly reporting the logged fault data when satisfying the filtering criteria of a device type.

20. The computer-implemented of claim 17, further comprising the fault reporting component wirelessly reporting the logged fault data when satisfying the filtering criteria of being a subscriber to a selected wireless service provider.

21. The computer-implemented of claim 17, further comprising the fault reporting component wirelessly reporting the logged fault data when satisfying the filtering criteria of a time window.

22. The computer-implemented of claim 17, further comprising a wireless multicast reception component, the fault reporting component responsive to receiving the fault reporting enabling event by multicast.

23. The computer-implemented of claim 22, further comprising a wireless unicast transceiver, the fault reporting component responsive to receiving the fault reporting enabling event by either unicast or multicast.

24. The computer-implemented apparatus of claim 15, further comprising a location sensing component, the fault data including the location associated with the fault condition.

25. The computer-implemented apparatus of claim 15, further comprising a user interface, the fault reporting enabling event comprising a user input.

\* \* \* \* \*